US009982779B2

(12) United States Patent
Kinch et al.

(10) Patent No.: US 9,982,779 B2
(45) Date of Patent: May 29, 2018

(54) TRANSMISSION HYDRAULIC CONTROL SYSTEM INCLUDING THERMAL VALVE

(71) Applicant: FORD GLOBAL TECHNOLOGIES, LLC, Dearborn, MI (US)

(72) Inventors: Derek Kinch, Ypsilanti, MI (US); David A. Pollard, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 696 days.

(21) Appl. No.: 14/282,051

(22) Filed: May 20, 2014

(65) Prior Publication Data

US 2015/0337955 A1    Nov. 26, 2015

(51) Int. Cl.
*F16H 57/04* (2010.01)
*F16H 61/48* (2006.01)
*F16K 11/065* (2006.01)

(52) U.S. Cl.
CPC ............. *F16H 61/48* (2013.01); *F16H 57/04* (2013.01); *F16H 57/0417* (2013.01); *F16H 57/0484* (2013.01); *F16K 11/0655* (2013.01); *Y10T 137/86863* (2015.04)

(58) Field of Classification Search
CPC ...... F16H 61/48; F16H 57/0484; F16H 57/04; F16H 57/0417; F16K 11/0655; F28F 2250/06; F24F 11/30; F24F 2140/20; F24F 11/81; F24F 11/63
See application file for complete search history.

(56) References Cited

U.S. PATENT DOCUMENTS

| 2,444,711 | A | * | 7/1948 | Shaw | F01M 5/007 236/34.5 |
|---|---|---|---|---|---|
| 2,540,629 | A | * | 2/1951 | Miller | F01M 5/007 165/280 |
| 3,053,051 | A | * | 9/1962 | Kelley | 60/329 |
| 3,913,831 | A | * | 10/1975 | Talak | F01M 5/007 137/625.29 |
| 5,890,509 | A | * | 4/1999 | Becker | F15B 21/045 137/115.26 |
| 6,044,645 | A | * | 4/2000 | Greenan | F16H 57/0412 60/337 |
| 6,105,616 | A | * | 8/2000 | Sturman | F15B 13/044 137/625.65 |

(Continued)

*Primary Examiner* — F. Daniel Lopez
*Assistant Examiner* — Abiy Teka
(74) *Attorney, Agent, or Firm* — James Dottavio; Brooks Kushman P.C.

(57) ABSTRACT

A hydraulic control system provides lubrication fluid to a gearbox via two flow paths in parallel. One of the flow paths includes a passive thermal valve in series with a heat exchanger. When the fluid temperature is elevated, the thermal valve opens such that fluid flows through the heat exchanger for cooling. The thermal valve restricts flow to the heat exchanger when transmission fluid is in a normal operating temperature range, reducing flow demands. When the flow demands are reduced, a variable displacement pump requires less torque improving fuel economy. The thermal valve may also open when the fluid is below the normal operating temperature such that the heat exchanger heats the fluid. The parallel path may include a regulator valve. When the pressure of fluid in the lubrication circuit is elevated, the regulator valve reduces flow through the parallel path and may also divert flow to a sump.

13 Claims, 9 Drawing Sheets

(56) References Cited

U.S. PATENT DOCUMENTS

| | | |
|---|---|---|
| 6,253,837 B1 | 7/2001 | Seiler et al. |
| 6,740,000 B2 * | 5/2004 | Wakayama ......... F16H 57/0412 137/599.14 |
| 6,772,958 B1 | 8/2004 | Lamb et al. |
| 7,469,841 B1 | 12/2008 | Lamb et al. |
| 7,617,700 B2 | 11/2009 | Lamb et al. |
| 8,109,242 B2 * | 2/2012 | Deivasigamani ......... F01P 7/16 123/41.1 |
| 8,141,790 B2 * | 3/2012 | Sheppard ................. F01P 7/16 236/100 |
| 8,490,885 B2 | 7/2013 | Lamb et al. |
| 2010/0254828 A1 * | 10/2010 | Frait ................... F16H 61/0021 417/53 |
| 2012/0183391 A1 * | 7/2012 | Czechowski ........... F04D 13/12 415/175 |
| 2012/0247582 A1 | 10/2012 | Lamb et al. |

\* cited by examiner

FIG. 1 – Prior Art

TRANSMISSION HYDRAULIC CONTROL SYSTEM INCLUDING THERMAL VALVE

TECHNICAL FIELD

This disclosure relates to the field of automotive transmission hydraulic control systems. More particularly, the disclosure pertains to a hydraulic control system designed to passively regulate the temperature of the hydraulic fluid.

BACKGROUND

FIG. 1 illustrates a vehicle powertrain. Heavy lines indicate mechanical power flow whereas thin lines indicate flow of transmission fluid. Dotted lines represent control signals. Engine 10 drives torque converter 12 which, in turn, drives gearbox 14. Gearbox 14 may adjust the speed and torque before transmitting the mechanical power to an output shaft. The gear ratio of gearbox 14 is selected by providing pressurized fluid to hydraulically actuated clutches. Pump 16, driven mechanically by engine 10, draws fluid from sump 18. Regulator valve 20 diverts some portion of the flow back to the sump in order to controls the pressure in line pressure circuit 22. Regulator valve 22 responds to a control signal from electronic controller 23 indicating the desired line pressure value. A component that acts in response to a control signal is called an actively controlled component. In response to commands from controller 23, valve body 24 routes the pressurized fluid to the torque converter circuit 26 and the appropriate clutch circuits 28 to establish the desired gear ratio in gearbox 14. Fluid exiting the torque converter goes into bypass valve 28. When the fluid temperature is below a threshold, bypass valve 28 routes the fluid directly to lubrication circuit 30. When the temperature of the fluid is above the threshold, bypass valve 28 routes the fluid through heat exchanger 32 before routing it to lubrication circuit 30. Components which do not require any control signals, such as bypass valve 28, are called passively controlled components. Fluid in the lubrication circuit provides lubrication to gearbox 14 and absorbs heat. The fluid then returns to sump 18.

When fluid is routed through first through one circuit and then through the other circuit, the two circuits are said to be in series. The flow rate through the first circuit is equal to the flow rate through the second circuit and the sum of the pressure drops across the circuits is equal to the pressure drop across the combination. When fluid is routed through only one of the circuits, on the other hand, the circuits are said to be in parallel. The pressure drop across the first circuit is equal to the pressure drop across the parallel circuit and the flow rate of the combined circuit is equal to the sum of the flow rates through each of the parallel circuits.

The transmission operates most efficiently when the fluid is at an optimal temperature. When the fluid is too cold, its viscosity is higher increasing parasitic drag. If the fluid gets too hot, the viscosity is too low resulting in increased leakage around the pump and elsewhere. This increased leakage reduces the pressure available from pump 16 reducing the torque capacity of the clutches within gearbox 14. If the fluid temperature remains high for a sufficient period of time, the friction characteristics of the clutches change and shift quality degrades. The temperature of the fluid is controlled by selectively routing the lubrication fluid through heat exchanger 32. When the fluid temperature is high, lubrication fluid is routed through heat exchanger 32 such that heat is dissipated either directly to the air or to an intermediate fluid such as engine coolant. When the fluid temperature is low, on the other hand, bypass valve 28 routes the fluid directly to gearbox 14 bypassing the heat exchanger and thus permitting the fluid to warm up. Note that, although regulator valve 20, valve body 24, and bypass valve 28 are illustrated in FIG. 1 as distinct components, some embodiments may integrate regulator valve 20 and bypass valve 28 into the valve body.

Most transmissions use positive displacement pumps. The volume of oil that is pressurized by the pump per unit time is dependent on the pump displacement and the engine speed. The torque required to drive the pump is dependent on the displacement and the pressure to which the fluid is pressurized. The power loss of the pump is proportional to the torque and the speed. Some transmissions utilize fixed displacement pumps. If the pump pressurizes more fluid than required at a particular time, the excess volume in discharged by regulator valve 20 with no reduction in either pump speed or pump torque. To reduce pump power loss and improve fuel economy, some transmissions utilize a variable displacement pump. The pump displacement is adjusted as fluid flow requirements change. When less fluid is required, the reduced pump displacement results in lower pump torque and reduced pump power loss.

SUMMARY OF THE DISCLOSURE

A hydraulic control system includes a heat exchanger flow path and a parallel flow path from a torque converter to a lubrication circuit. The heat exchanger flow path includes a heat exchanger and a passive valve arranged in series. The passive valve reduces the flow rate when fluid temperature is less than a first threshold. The passive valve may also increase the flow rate when fluid temperature is below a lower threshold. The control system may also include a flow path in parallel with the valve and in series with the heat exchanger. The pressurized fluid may be provided by a variable displacement pump. A regulator valve in the parallel flow path may reduce the flow when lubrication circuit pressure exceeds a pressure threshold. The regulator valve may also exhaust fluid from the lubrication circuit to relieve pressure.

In another embodiment, a hydraulic control system includes a heat exchanger in series with a passive valve. The valve responds to changes in fluid temperature by permitting full flow when the temperature is below a lower threshold and permitting full flow when temperature is above an upper threshold while blocking flow when temperature is between the two thresholds. A parallel flow path may provide flow at all temperatures. A regulator valve in the parallel flow path may reduce the flow when lubrication circuit pressure exceeds a pressure threshold. The regulator valve may also exhaust fluid from the lubrication circuit to relieve pressure.

A valve suitable for use in a hydraulic control system includes a valve bore, a moveable spool, and a wax cartridge. The wax cartridge causes the spool to move within the bore in response to fluid temperature. The valve bore defines three ports. An annulus in the spool permits flow between the first and second ports in a first position, permits flow between the second and third ports in a second position, and blocks flow from the second port in a third position between the first and second positions. The valve bore may define a fourth port to provide thermal communication between a fluid and the wax cartridge. The first and third ports may be directly connected to a common hydraulic circuit.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
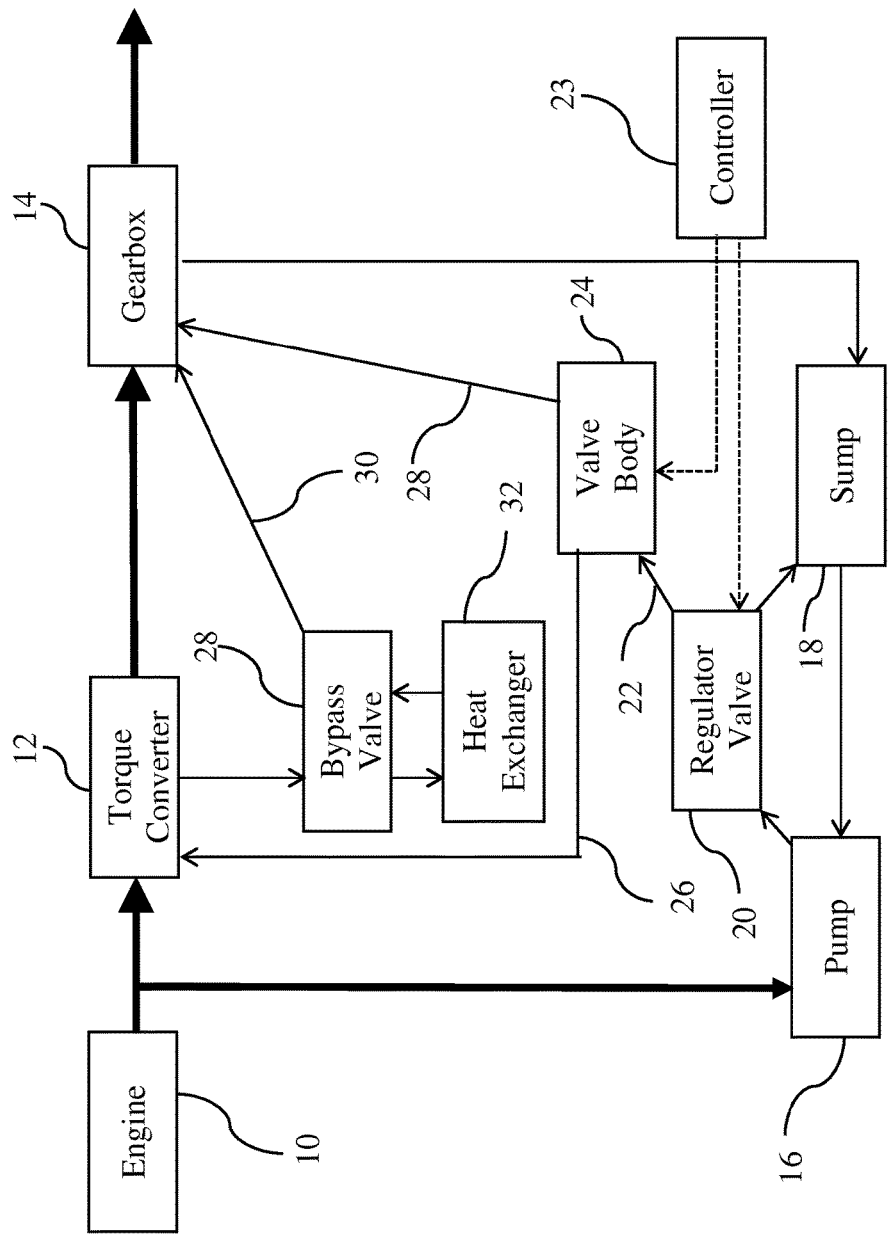
FIG. 1 is a schematic representation of transmission hydraulic network.
Figure 2:
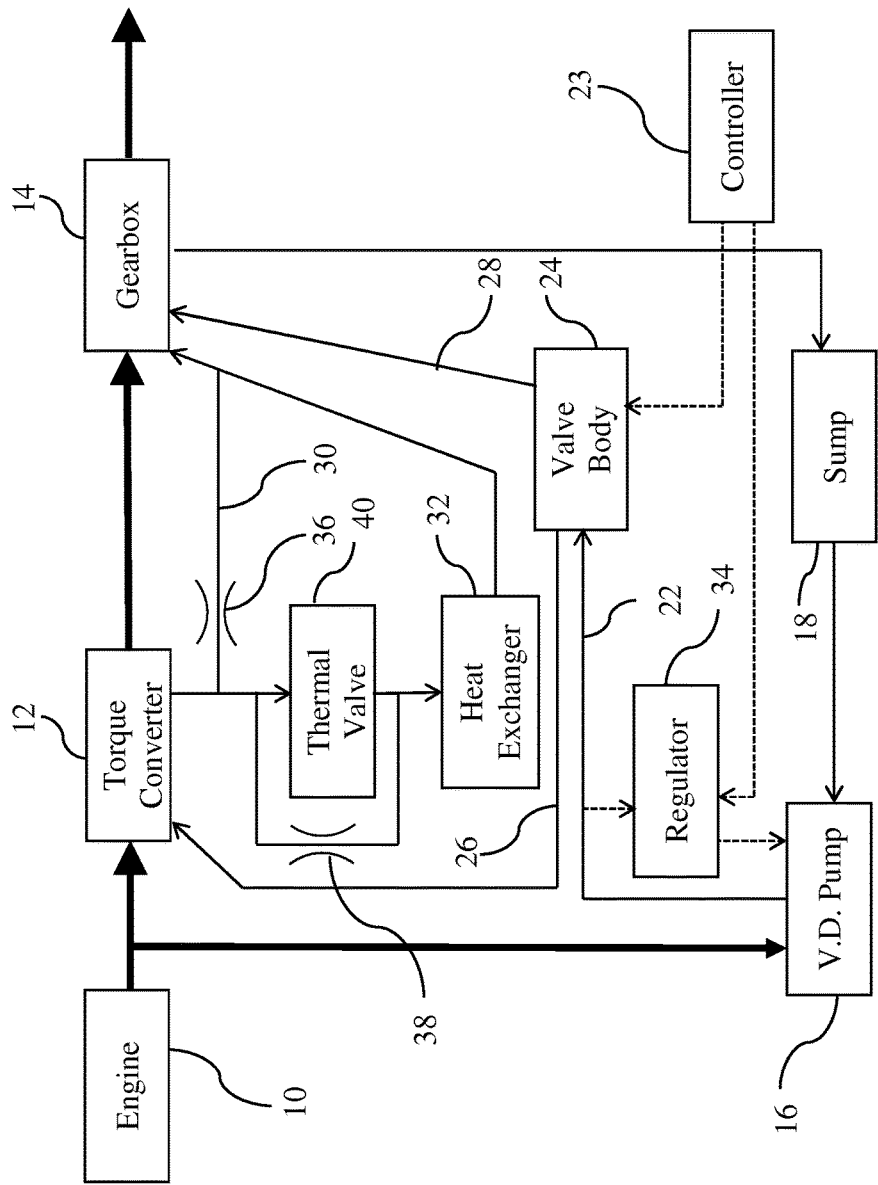
FIG. 2 is a schematic representation of a first transmission hydraulic network according to the present invention.

A portion of a transmission hydraulic control system is illustrated schematically in FIG. 2. Heavy lines indicate mechanical power flow whereas thin lines indicate flow of transmission fluid. Dotted lines represent control signals. Engine 10 drives torque converter 12 which, in turn, drives gearbox 14. The gear ratio of gearbox 14 is selected by providing pressurized fluid to hydraulically actuated clutches. Variable displacement pump 16, driven mechanically by engine 10, draws fluid from sump 18 and delivers it to the valve body in line pressure circuit 22. In response to a signal from controller 23, regulator 34 adjusts the displacement of pump 16 in order control the pressure in line pressure circuit 22. The control signals from line pressure circuit 22 to regulator 34 and from regulator 34 to pump 16 may take the form of a pressure in a hydraulic connection with negligible flow rate. Valve body 24 routes the pressurized fluid to the torque converter circuit and the appropriate clutch circuits 28 to establish the desired gear ratio in gearbox 14. Fluid exiting the torque converter is split into two parallel circuits on its way to lubrication circuit 30. Fluid in the lubrication circuit provides lubrication to gearbox 14 and absorbs heat before returning to sump 18.

A portion of the fluid exiting the torque converter flows to the lubrication circuit through orifice 36. The remainder of the flow is routed through heat exchanger 32. When the fluid temperature is in the normal operating range, fluid in the heat exchanger circuit flows through orifice 38 into heat exchanger 32 at a relatively low flow rate. When the fluid temperature is higher than a threshold, thermal valve 40 permits a considerably higher flow rate through heat exchanger 32. Since pump 16 is a variable displacement pump, the reduced flow rate through the heat exchanger when the temperature is in the normal operating range permits pump 16 to operate with reduced displacement and therefore reduced power consumption.

Some embodiments may be configured to provide accelerated transmission fluid warm-up. In these embodiments, heat exchanger 32 provides heat transfer between transmission fluid and engine coolant. Furthermore, thermal valve 40 is configured to provide an increased flow rate when the transmission fluid is below the normal operating temperature range. Since the engine coolant tends to heat up sooner during a drive cycle, during the early stages of a drive cycle, heat flows from the engine coolant to the transmission fluid. As the transmission fluid warms up toward normal operating temperatures, its viscosity decreases and transmission parasitic losses decrease. Since the transmission spends less time subject to the increased parasitic loss associated with cold transmission fluid, fuel consumption for the drive cycle improves.

Figure 3:
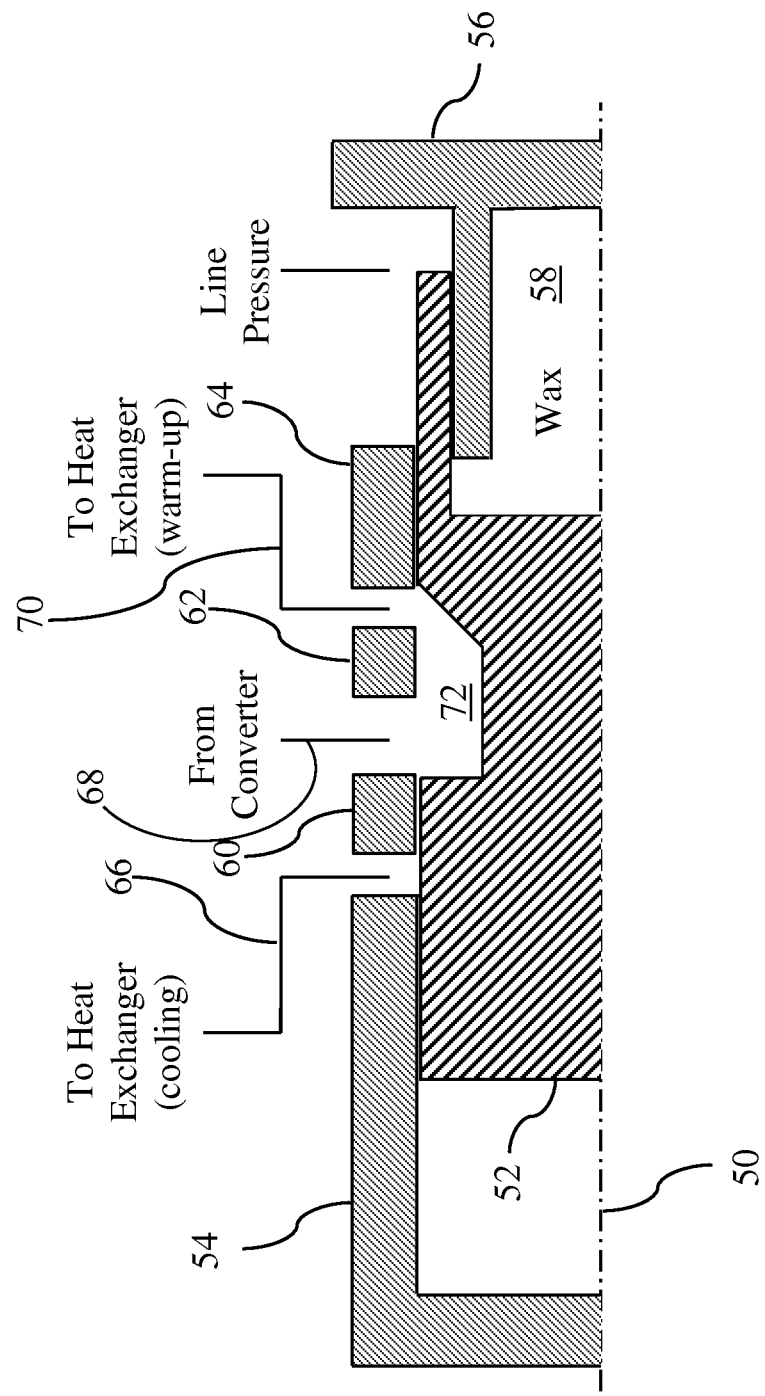
FIG. 3 is a cross sectional view of a thermal valve when fluid is colder than a normal operating temperature range.

FIG. 3 shows a cross section of thermal valve 40. Valve 40 is axisymetric with respect to centerline 50. Spool 52 slides axially within valve bore 54. Plug 56 is stationary with respect to valve bore 54. Spool 52 and plug 56 define a chamber which contains a wax cartridge 58. The line pressure circuit flows past the valve such that the temperature of the wax approximates the temperature of the fluid in the line pressure circuit. As the wax heat up, it expands pushing spool 52 to the left. As the wax cools, spool 52 moves to the right. The valve bore includes several lands 60, 62, and 64 which define three ports 66, 68, and 70. Middle port 68 is connected to the torque converter outlet circuit. Left and right ports 66 and 70 are connected to the heat exchanger inlet circuit. Spool 52 includes an annulus 72 that, in certain spool positions, allows fluid to flow from port 68 to either port 66 or port 70. FIG. 3 shows the spool in the position corresponding to fluid below the normal operating temperature. In this position, fluid flows freely from the converter outlet through port 68 to port 70 to the heat exchanger. This provides a high flow rate when the fluid is cold such that the transmission fluid is heated by the engine coolant for faster transmission warm-up. In embodiments that do not implement this warm-up feature, port 70 would not be present.

Figure 4:
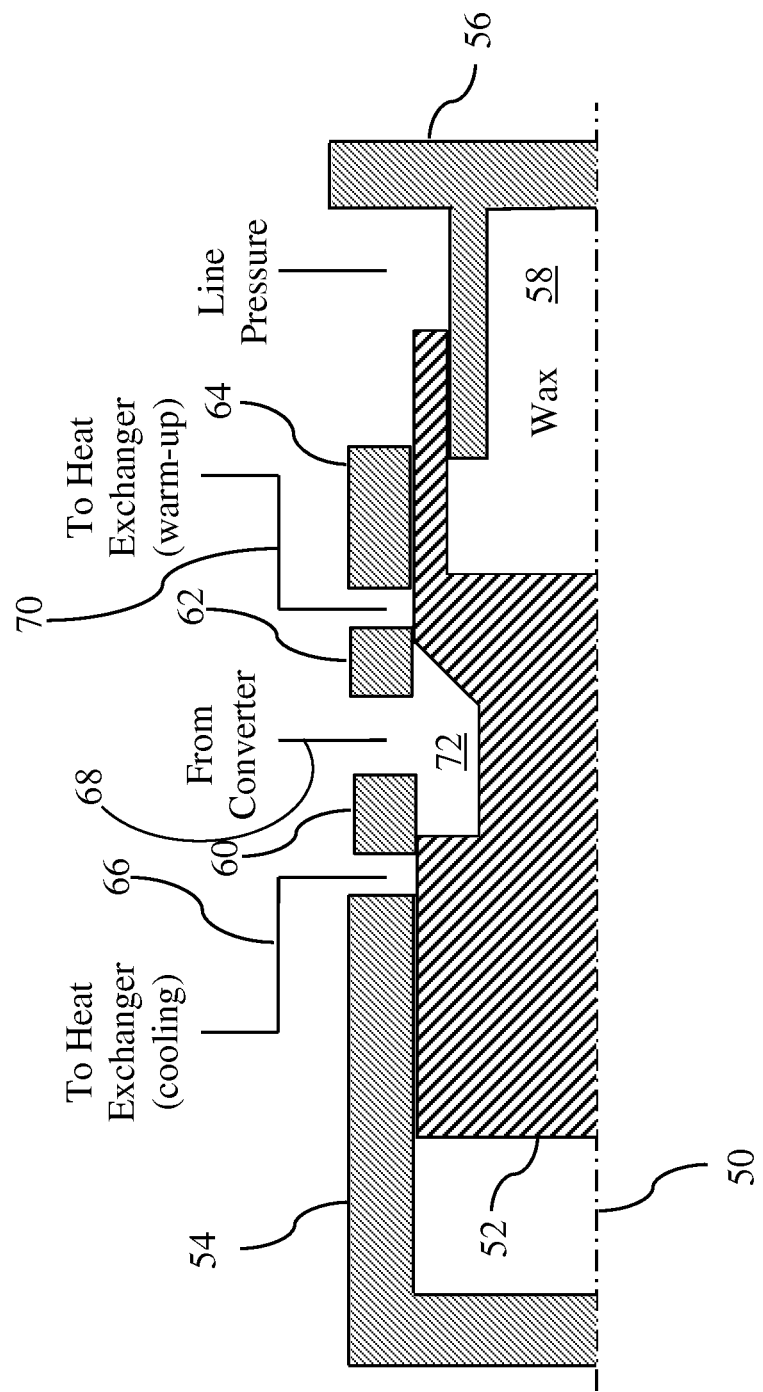
FIG. 4 is a cross sectional view of the thermal valve of FIG. 3 when fluid is within the normal operating temperature range.

FIG. 4 shows the thermal valve in the position corresponding to normal operating temperature. Expansion of the wax has pushed the spool to the left relative to the position in FIG. 3. In this position, flow between port 68 and ports 66 and 70 is blocked off. The only flow to the heat exchanger is the minimal level permitted by orifice 38. Since the flow rate of fluid is reduced, the displacement of pump 16 may be reduced, thus reducing pump torque and improving fuel economy.

Figure 5:
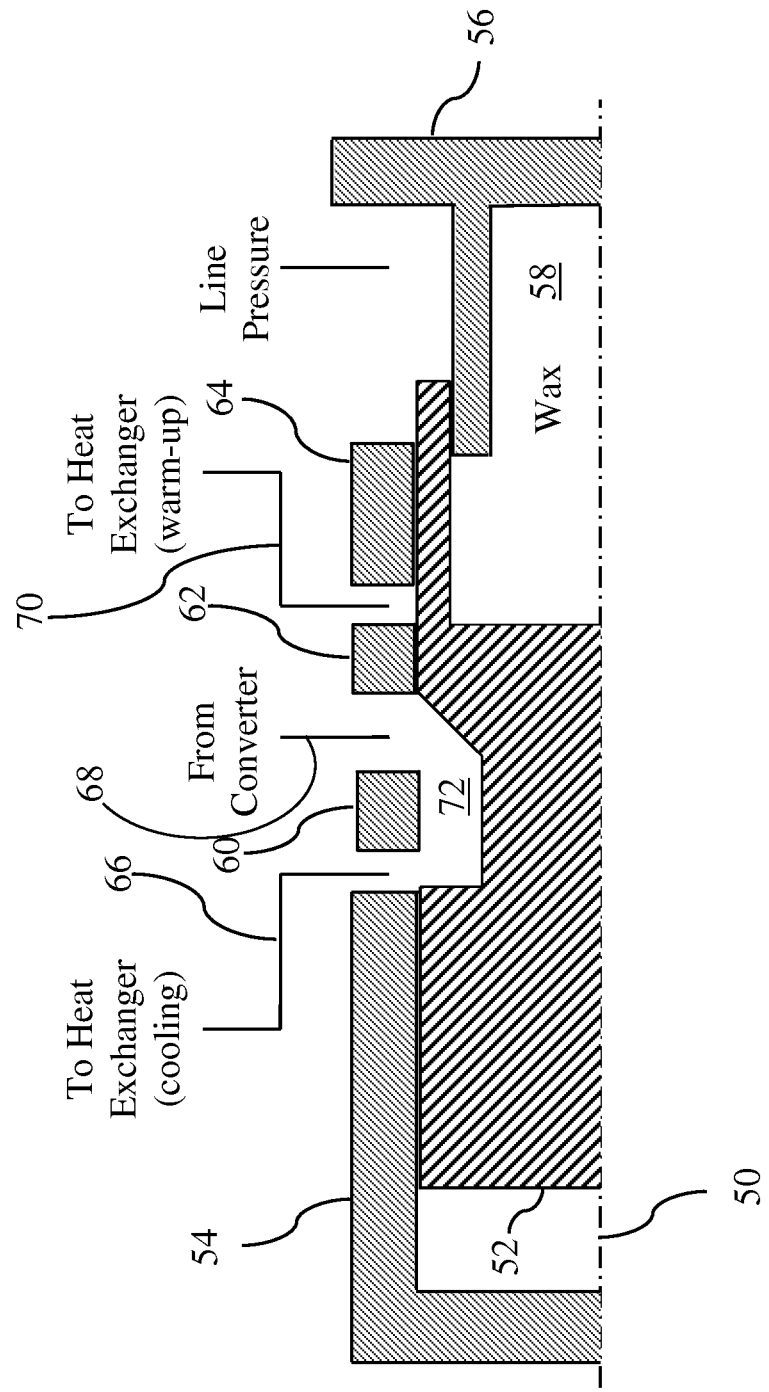
FIG. 5 is a cross sectional view of the thermal valve of FIG. 3 when fluid is warmer than the normal operating temperature range.

FIG. 5 shows the thermal valve in the position corresponding to temperatures above normal operating temperature. Expansion of the wax has pushed the spool further to the left relative to the positions in FIGS. 3 and 4. In this position, fluid flows freely from port 68 to port 66. This provides a high flow rate when the fluid is warm such that heat is transferred from the transmission fluid to engine coolant and eventually to ambient air.

Figure 6:
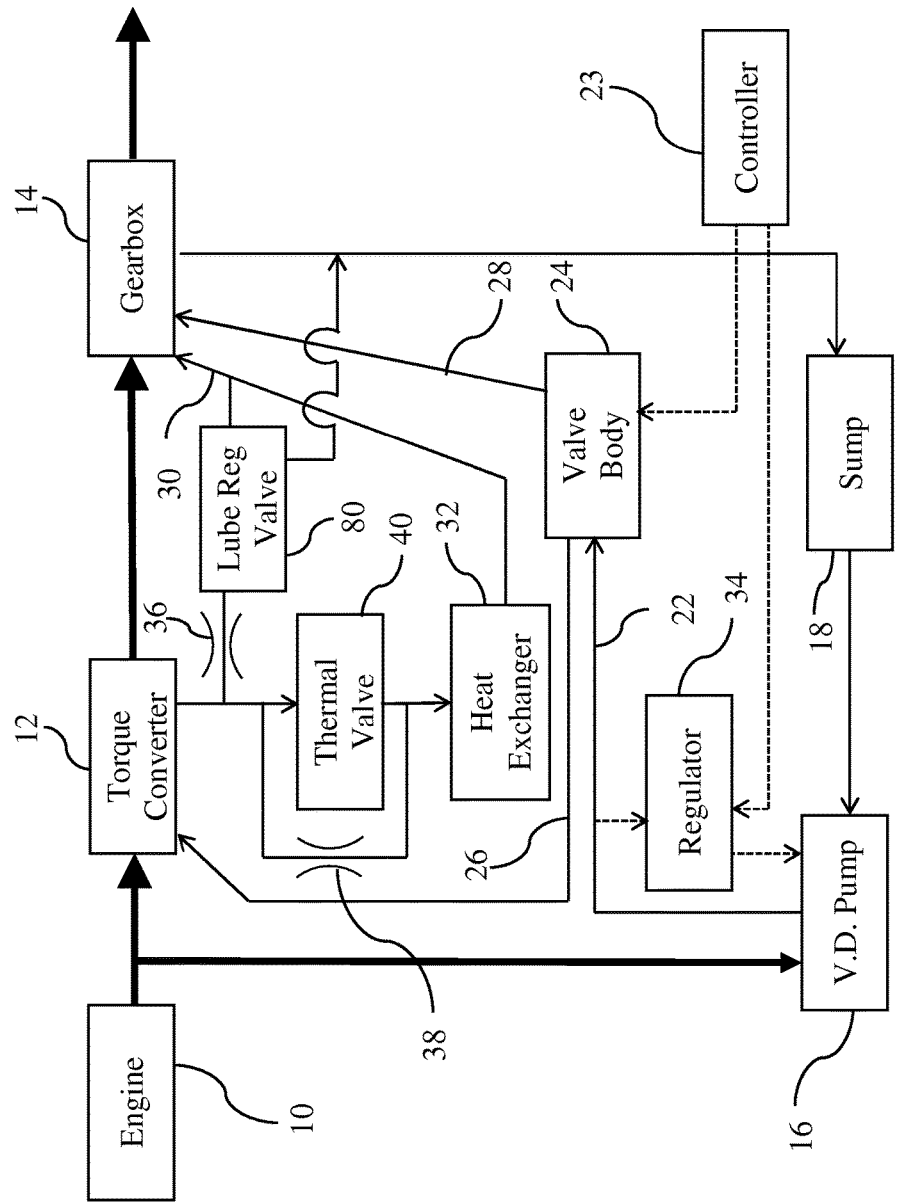
FIG. 6 is a schematic representation of a second transmission hydraulic network according to the present invention.

The system is even more efficient in the normal operating temperature range when lube regulator valve 80 is included as shown in FIG. 6. Regulator valve 80 responds to changes in the pressure in circuit 30. When the pressure in circuit 30 is less than a first threshold, regulator valve 80 permits fluid to flow freely from the torque converter outlet to circuit 30. When the pressure in circuit 30 exceeds the first threshold, regulator valve begins to restrict the flow, completely blocking the flow when the pressure reaches a second threshold. In response, regulator 34 can reduce the displacement of pump 16, reducing the torque required to drive the pump. If the pressure continues to rise above a third threshold, regulator valve 80 diverts fluid from circuit 30 to sump 18. In addition to reducing pump flow requirements, regulator valve 80 ensures that the pressure in circuit 30 will not increase excessively. Excessive pressure in circuit 30 may result in excessive lubrication flow which may cause excessive drag. In addition to supplying lubrication flow, circuit 30 may supply fluid to balance chambers of transmission clutches. Excessive pressure in a balance chamber may cause a clutch to partially disengage. When a clutch piston is stroked, fluid is pushed out of the balance chamber which can cause a pressure increase in circuit 30 unless a relief path is available.

Figure 7:
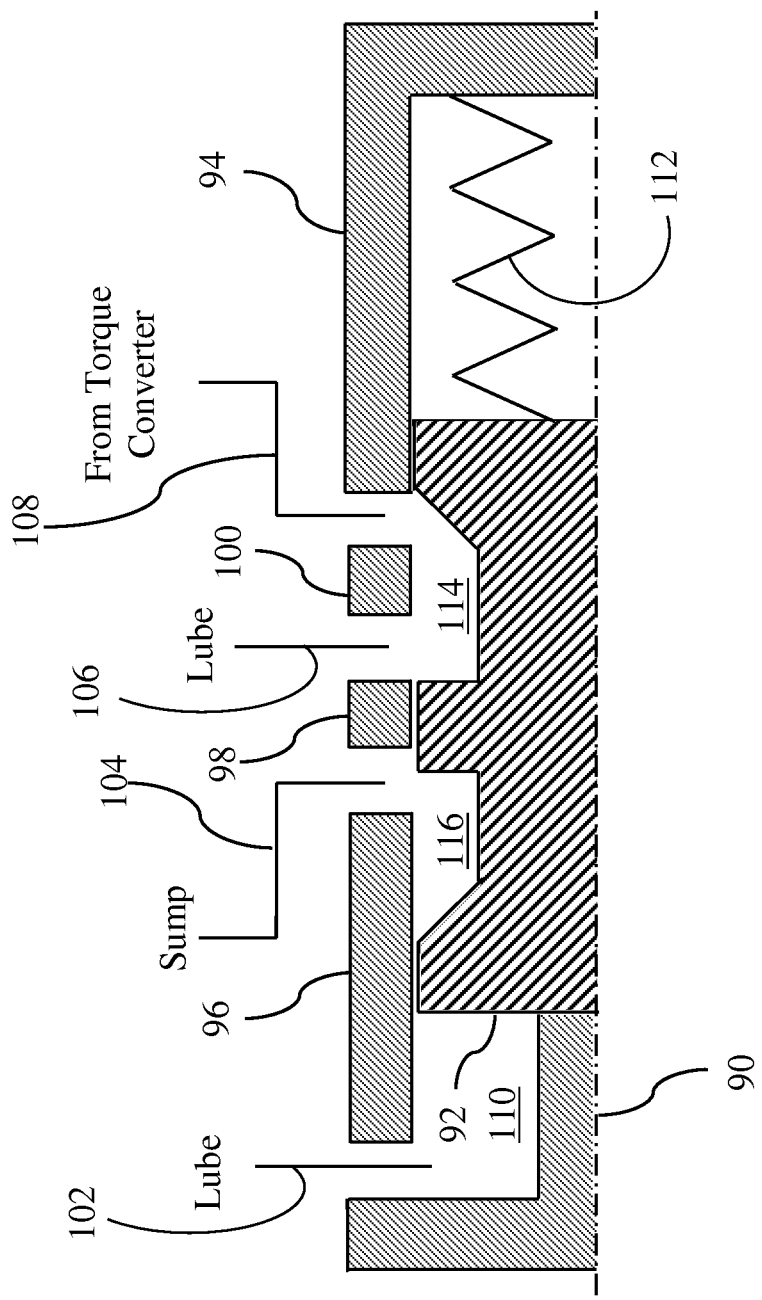
FIG. 7 is a cross sectional view of a lubrication regulator valve when lubrication pressure is within a normal range.
Figure 8:
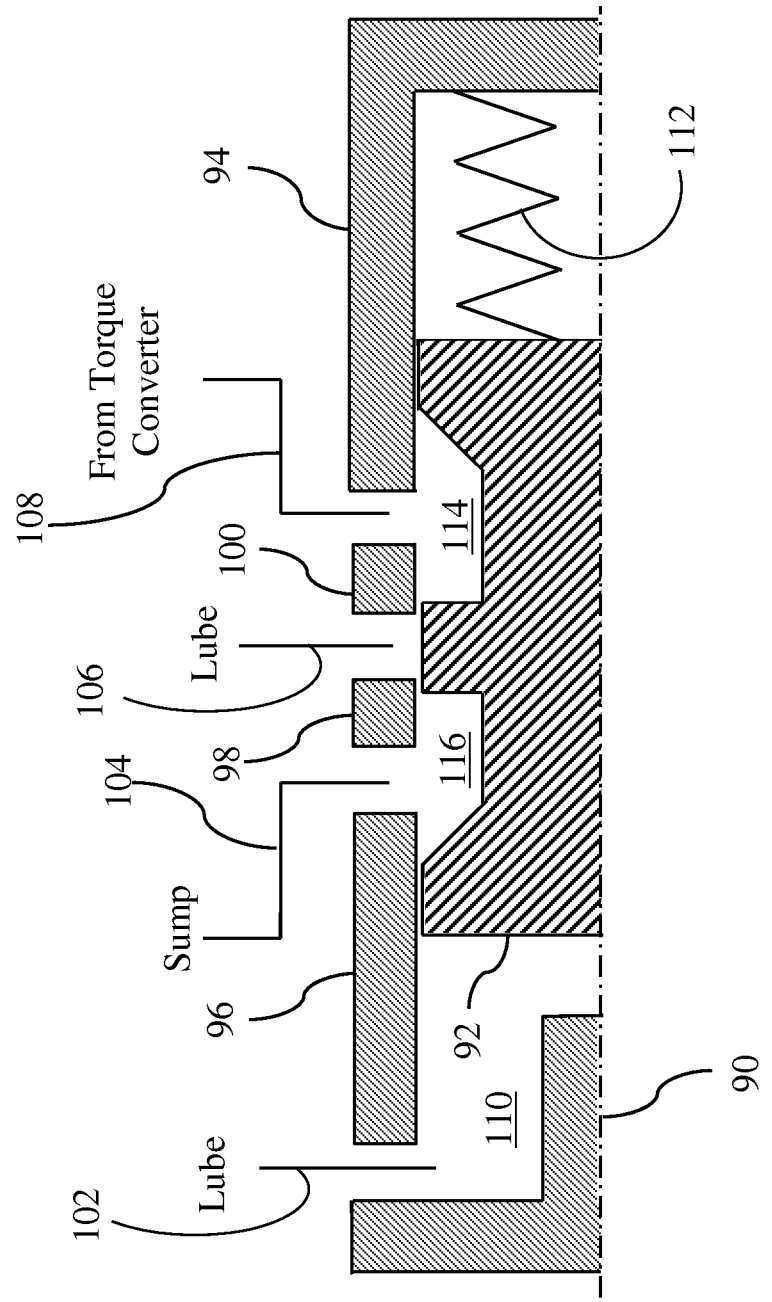
FIG. 8 is a cross sectional view of the lubrication regulator valve of FIG. 7 when lubrication pressure is above the normal range.
Figure 9:
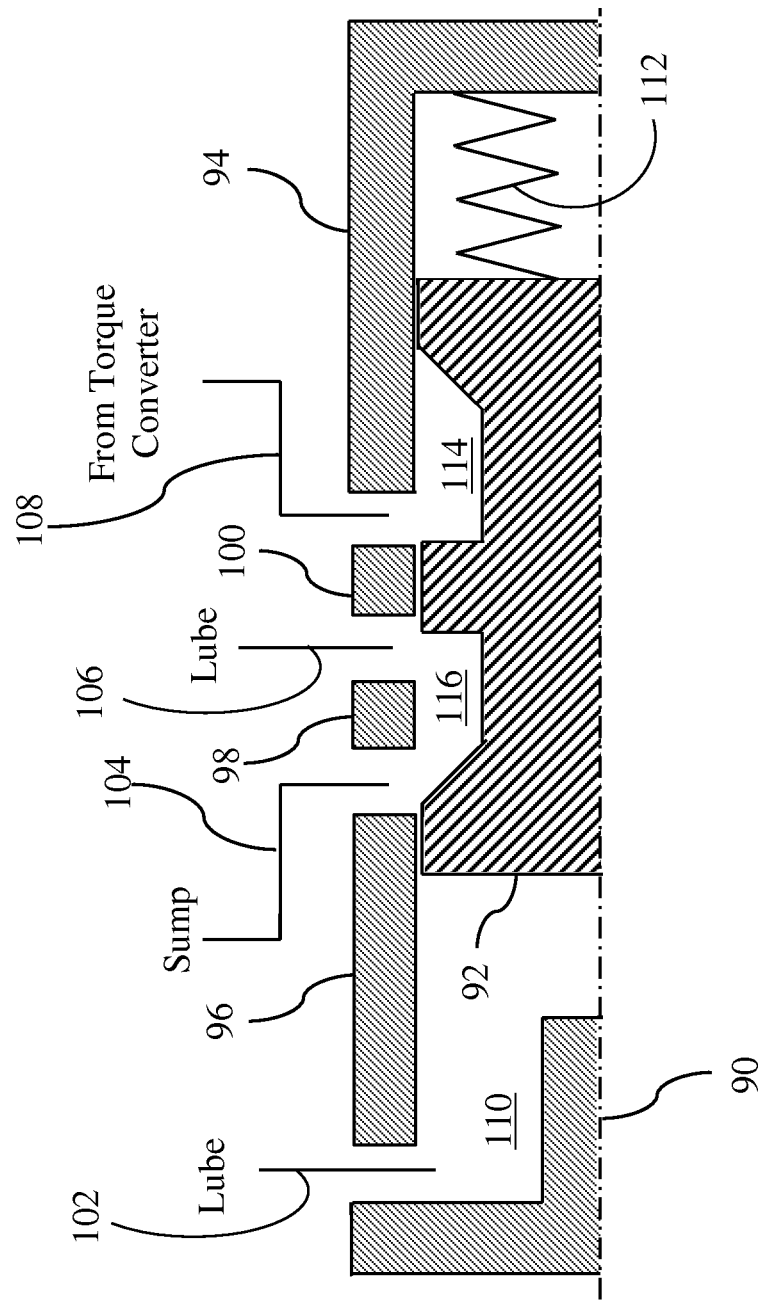
FIG. 9 is a cross sectional view of the lubrication regulator valve of FIG. 7 when lubrication pressure is farther above the normal range.

FIG. 7 shows a cross section of lube regulator valve 80. Valve 80 is axisymetric with respect to centerline 90. Spool 92 slides axially within valve bore 94. The valve bore includes several lands 96, 98, and 100 which define four ports 102, 104, 106, and 108. The lube pressure circuit 30 is connected to ports 102 and 106. The position of spool 92 is determined by the pressure of chamber 110 which is connected to lube circuit 30. When the pressure in chamber 110 is low, spring 112 forces spool 92 to the left against a stop. In this position, fluid from the torque converter outlet flows freely to the lube circuit through annulus 114. If pressure in lube circuit 30 increases, spool 92 will move to the right as shown in FIG. 8, blocking the flow of fluid to lube circuit 30. If pressure in lube circuit 30 increases even further, spool 92 will move further to the right to the position shown in FIG. 9. In this position, fluid from lube circuit 30 flows to the sump through annulus 116 to relieve the pressure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hydraulic control system for a transmission comprising:
   a heat exchanger flow path from a torque converter to a lubrication circuit including a heat exchanger in series with a passive valve configured to reduce a heat exchanger flow rate in response to a fluid temperature being less than a first threshold and further configured to increase the heat exchanger flow rate in response to the fluid temperature being less than a second threshold that is less than the first threshold; and
   a parallel flow path from the torque converter to the lubrication circuit, bypassing the heat exchanger, to provide flow at fluid temperatures both above and below the first threshold.

2. The hydraulic control system of claim 1 further comprising a variable displacement pump configured to provide pressurized fluid to the transmission.

3. The hydraulic control system of claim 2 further comprising flow path in parallel with the passive valve and in series with the heat exchanger.

4. The hydraulic control system of claim 2 wherein the parallel flow path includes a regulator valve configured to reduce flow through the parallel path when a lubrication circuit pressure exceeds a first threshold.

5. The hydraulic control system of claim 4 wherein the regulator valve is further configured to exhaust fluid from the lubrication circuit when the lubrication pressure exceeds a second threshold greater than the first threshold.

6. A hydraulic control system comprising:
   a heat exchanger; and
   a passive valve in series with the heat exchanger and configured to respond to changes in a fluid temperature by permitting flow to warm the fluid at temperatures less than a first threshold, by permitting flow to cool the fluid at temperatures greater than a second threshold, and to block flow at temperatures between the first threshold and the second threshold to reduce flow demand.

7. The hydraulic control system of claim 6 further comprising a flow path in parallel with the heat exchanger and the passive valve to provide flow at all temperatures.

8. The hydraulic control system of claim 7 wherein the parallel flow path includes a regulator valve configured to reduce flow through the parallel path when a fluid pressure exceeds a first threshold.

9. The hydraulic control system of claim 8 wherein the regulator valve is further configured to exhaust fluid from when the fluid pressure exceeds a second threshold greater than the first threshold.

10. A valve comprising:
    a valve bore defining first, second, and third ports;
    a spool movable within the valve bore and configured to permit flow between the first and second ports in a first position, to permit flow between the second and third ports in a second position, and to block flow from the second port in a third position; and
    a wax cartridge configured to vary spool position in response to changes in temperature.

11. The valve of claim 10 wherein the third position is between the first position and the second position.

12. The valve of claim 10 wherein the valve bore further defines a fourth port configured to provide thermal communication between a fluid flowing into the fourth port and the wax cartridge.

13. The valve of claim 10 wherein the first and third ports are directly connected to a common hydraulic circuit.

\* \* \* \* \*